Nov. 4, 1952  A. C. SCINTA  2,616,113
WINDSHIELD CLEANER
Filed Jan. 21, 1947
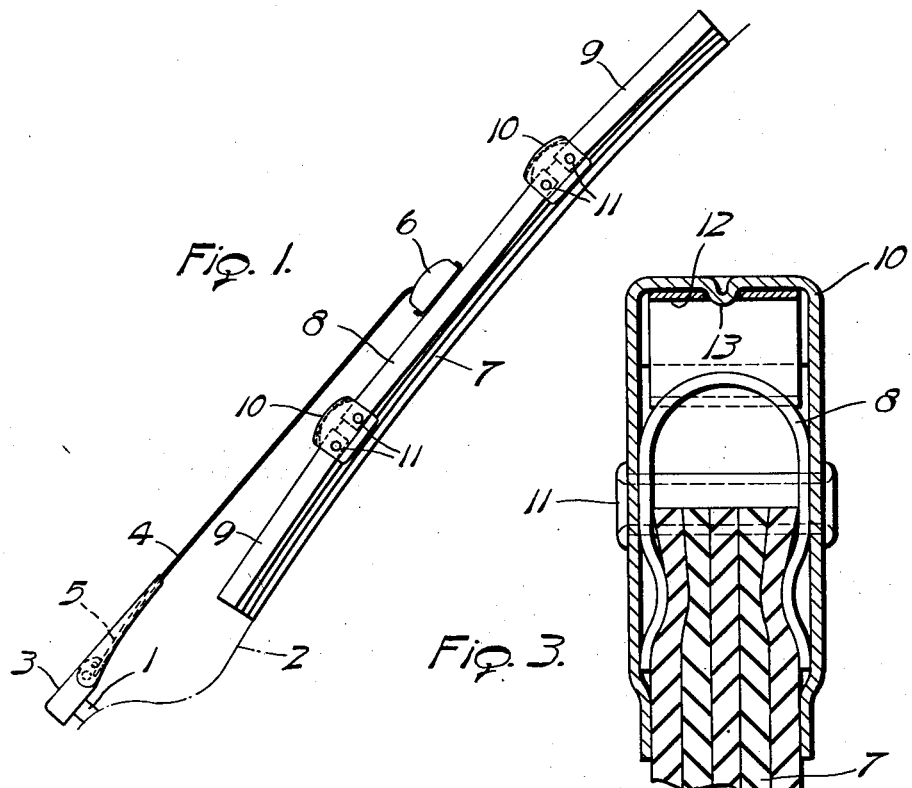
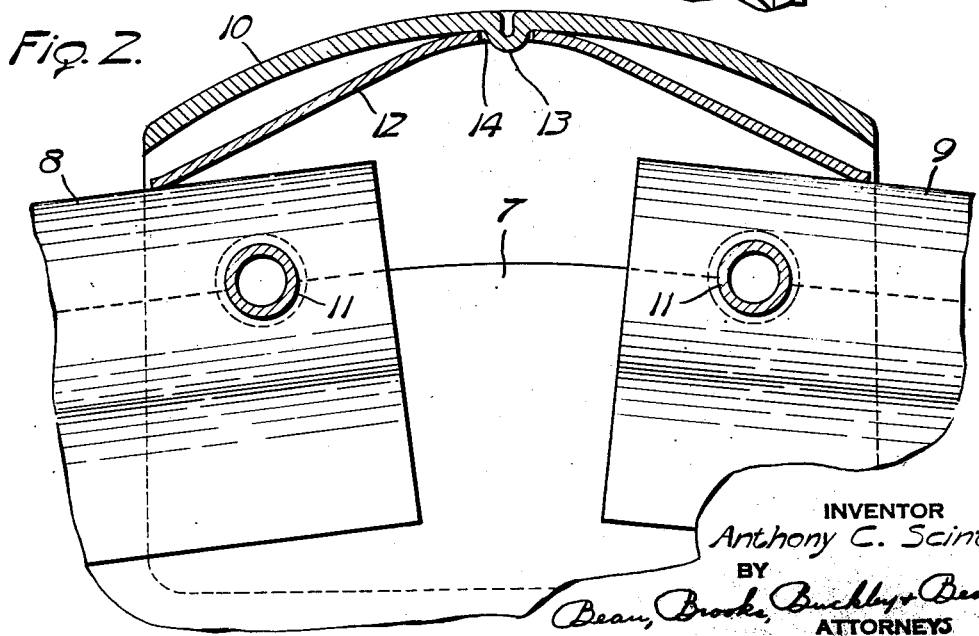
INVENTOR
Anthony C. Scinta
BY
Bean, Brooks, Buckley & Bean
ATTORNEYS Patented Nov. 4, 1952

2,616,113

UNITED STATES PATENT OFFICE 2,616,113

WINDSHIELD CLEANER

Anthony C. Scinta, Buffalo, N. Y., assignor to Trico Products Corporation, Buffalo, N. Y.

Application January 21, 1947, Serial No. 723,390

10 Claims. (Cl. 15—255)

This invention relates to the windshield cleaning art and especially to a wiper for cleaning curved windshield surfaces.

It has heretofore been proposed to provide a wiping blade with an articulated backing to enable the wiping edge more readily conforming to the curvature of the surface being wiped. The stiffening sections or members composing the articulated backing are pivotally connected together and so mounted as to hold the wiping edge down upon the windshield surface. This necessitates the backing members being individually supported by the wiper actuating arm.

The object of the present invention is to provide a wiper of this character which will insure uniform wiping pressure throughout the several sections of the articulated structure.

The invention further has for its object to provide a wiper for curved windshields which is of practical design and economical in construction.

The foregoing and other objects will manifest themselves as the following description progresses, reference being made to the accompanying drawing, wherein:

Fig. 1 is a side elevation showing the improved windshield wiper in its operative position upon a windshield;

Fig. 2 is an enlarged fragmentary view depicting the mode of joining the sections of the wiper blade backing; and Fig. 3 is a transverse sectional view through the joint illustrated in Fig. 2.

Referring more particularly to the drawing, the numeral 1 designates an oscillatory shaft arranged at the lower side of the windshield 2 and carrying at its forward end an actuating arm 3 which has a pivotally mounted section 4 under the urge of a spring 5 to exert the desired pressure upon the wiper to which it is connected by a clip 6. The wiper, as shown, is of blade design and has a rubber or flexible body 7 with one continuous wiping edge along one margin for contacting the curved surface of the windshield 2. The wiping body may be composed of a stepped arrangement of plies, as indicated in Fig. 3, or it may be molded or otherwise formed. The back margin of the blade-like body is reinforced by two or more channeled backing members preferably of metal and deformed to clampingly embrace the rubber wiping body. Three backing members 8 and 9 are depicted in end to end relation to constitute links of an articulated backing for the otherwise flexible wiping body, the adjacent ends of the backing members being preferably spaced apart to avoid obstructing free pivotal movement therebetween as the wiping edge conforms to the windshield curvature.

The intervening space between adjacent back reinforcements is enclosed against the weather by a hollow housing 10. This may be U-shaped in cross section for straddling the adjacent ends, the sides of the housing being connected to the respective backing members, as by means of tubular rivets 11. The housing therefore serves as a connector between the members. One or both rivets may provide for pivotal movement between adjacent members.

The wiper attaching clip 6 is carried by the intermediate backing member 8 and therefore the urge of the arm spring 5 is applied directly thereto. For distributing this spring urge indirectly to the terminal members 9 auxiliary springs 12 are employed. These auxiliary springs are arranged within the housings 10, each having its outer end bearing upon the terminal section 9 outwardly beyond its pivot 11. This will exert a pressure upon the terminal backing member for holding the adjacent portion of the wiping edge in firm wiping contact with the windshield. If desired, the flat spring may be bowed and have its opposite end finding support upon the intermediate section 8 inwardly of its pivot 11, with the intermediate bowed portion of the spring reacting against the overlying wall of the housing, the latter being formed with a centering pin 13 to engage in an aperture 14 in the spring for locating the spring and retaining it in place. Thus, the springs 12 will serve to transmit the desired wiping pressure not only to the wiper part 8 but also to its extensions 9 and thereby enable the wiping edge being uniformly pressed against the windshield. The strength of the springs 12 will, of course, determine the pressure in the wiping contact of the terminal sections 9 as they work in conjunction with the main spring. The springs 12, therefore, serve to distribute the pressure from the spring 5 to the several sections of the blade backing.

The wiper is of simple construction and may readily be assembled for ecnoomy in manufacture. The foregoing description has been given in particular for the sake of clarity and not by way of limitation, since the inventive principles involved may be applied to other physical embodiments without departing from the scope and spirit of the invention claimed.

What is claimed is:

1. A wiper comprising a longitudinally extending wiping body reinforced at intervals by backing members, means for attaching one backing member to a wiper actuating member, and spring means connected at the opposite ends of said one backing member and acting upon adjacent backing members for urging the latter into wiping contact with a surface being wiped.

2. A curved surface wiper comprising a longitudinally extending flexible wiping body having a wiping edge along one margin and its opposite margin reinforced at intervals by relatively stiff backing members, means by which one backing member may be attached to an actuator, and resilient means pivotally connecting the opposite ends of said one backing member in series with the other backing members and yieldably conforming the wiping edge to the curvature of a surface being wiped.

3. A wiper comprising an elongated resilient body, three rigid backing members arranged in end to end relation along the body, means on the intermediate member for attaching it to an arm, means pivotally connecting the backing members into a composite articulated backing for the wiping body, and resilient means arranged in the pivoting means and acting on the backing members to urge the opposite end portions of the elongated body into a conformity with the surface being wiped.

4. A wiper comprising an elongated flexible body, three rigid backing members arranged along the back of the body, spaced means pivotally connecting the backing members in end to end relation to form an articulated backing for the wiping body, means for attaching the intermediate member to an actuator, and a spring coacting with each pivotal connecting means for deflecting the end backing members relative to the intermediate member toward the surface being wiped.

5. A wiper comprising an elongate resilient body having a continuous wiping edge along one margin, three backing members arranged in end to end relation along the opposite margin, means for attaching the intermediate member to an actuating arm, a housing pivotally connecting the adjacent ends of the backing members, and a spring within the housing having its opposite ends bearing upon the adjacent ends and its central portion reacting upon the housing for urging the end backing members toward the wiping edge.

6. A wiper comprising an elongate resilient body having a continuous wiping edge along one margin, three backing members arranged in end to end relation along the opposite margin, means for attaching the intermediate member to an actuating arm, a housing of channeled form inverted over each pair of adjacent ends of the backing members and having its opposite sides pivotally connected thereto, and a flat spring arranged in each housing and acting on the opposite end backing members to urge them toward the wiping edge.

7. A wiper comprising an elongate resilient body having a continuous wiping edge along one margin, three backing members arranged in end to end relation along the opposite margin, means for attaching the intermediate member to an actuating arm, a housing of channeled form inverted over each pair of the adjacent ends of the backing members and having its opposite sides pivotally connected thereto, and a bowed flat spring arranged within each housing with its opposite ends seating on the backing members at points outwardly beyond the pivotal connections whereby to urge the terminal backing members toward the wiping edge.

8. A wiper comprising an elongate resilient body having a continuous wiping edge along one margin, three backing members arranged in end to end relation along the opposite margin, means for attaching the intermediate member to an actuating arm, a housing of channeled form inverted over each pair of the adjacent ends of the backing members and having its opposite sides pivotally connected thereto, a bowed flat spring arranged within the housing with its opposite ends seating on the backing members at points outwardly beyond the pivotal connections whereby to urge the backing members toward the wiping edge, the intermediate bowed portion of the spring and the inner wall of the housing being interlocked by a projection on one part engaging in a recess in the other.

9. A windshield cleaner having a wiper, an actuating arm therefor, spring means acting upon the arm to urge the wiper into wiping contact with an associated windshield, said wiper having an articulated backing composed of rigid link members arranged in end to end relation and flexibly connected together, means operatively connecting the outer end of the arm to one of the link members, and other spring means arranged in the connection between the link members and reacting therebetween for urging the adjacent link member into wiping contact with the windshield in accordance with the spring urge of the first spring means.

10. A wiper comprising an elongated flexible body, a plurality of elongate rigid backing members arranged along the back of the body in supporting contact therewith, means pivotally connecting the backing members in end to end relation to form an articulated backing for the wiping body, means on one backing member intermediate its ends for attaching it to an actuator, and a spring arranged in the pivotal connecting means at an end of the one backing member for deflecting the backing members relative to each other toward the surface being wiped.

ANTHONY C. SCINTA.

REFERENCES CITED

The following references are of record in the file of this patent:

UNITED STATES PATENTS

| Number | Name | Date |
|---|---|---|
| 1,169,280 | Ousley | Jan. 25, 1916 |
| 1,694,245 | Baker | Dec. 4, 1928 |
| 2,276,556 | Zaiger | Mar. 17, 1942 |
| 2,303,694 | Horton | Dec. 1, 1942 |

FOREIGN PATENTS

| Number | Country | Date |
|---|---|---|
| 427,383 | Great Britain | Apr. 23, 1935 |
| 820,156 | France | July 26, 1937 |